(12) United States Patent
Riegel et al.

(10) Patent No.: US 8,640,229 B1
(45) Date of Patent: Jan. 28, 2014

(54) TOKEN-BASED SECURITY FOR LINKS TO MEDIA STREAMS

(71) Applicant: Wowza Media Systems, LLC, Evergreen, CO (US)

(72) Inventors: Brian M. Riegel, Golden, CO (US); James S. Sherry, Broomfield, CO (US)

(73) Assignee: Wowza Media Systems, LLC, Evergreen, CO (US)

( * ) Notice: Subject to any disclaimer, the term of this patent is extended or adjusted under 35 U.S.C. 154(b) by 0 days.

(21) Appl. No.: 13/944,374

(22) Filed: Jul. 17, 2013

(51) Int. Cl.
*H04L 12/16* (2006.01)
*H04L 12/22* (2006.01)

(52) U.S. Cl.
USPC .................................. 726/20; 726/5

(58) Field of Classification Search
None
See application file for complete search history.

(56) References Cited

U.S. PATENT DOCUMENTS

| | | | |
|---|---|---|---|
| 8,122,100 B2 * | 2/2012 | Raciborski et al. | 709/218 |
| 2005/0005146 A1 | 1/2005 | Kryeziu | |
| 2011/0047566 A1 | 2/2011 | Matuchniak et al. | |
| 2012/0324552 A1 | 12/2012 | Padala et al. | |
| 2013/0067109 A1 | 3/2013 | Dong et al. | |

OTHER PUBLICATIONS

SIP signaling security for end-o-end communications. Ono et al. IEEE(2003).*
"How to add SecureToken protection to LongTail JW Payer 5 and 6"; retrieved on Apr. 16, 2013 from http://www.wowza.com/forums/content/php?51; published on Oct. 1, 2010; 5 pages.
"How to protect RTMP streaming using SecureToken"; retrieved Apr. 16, 2013 from http://www.wowza.com/forums/content.php?450; published Nov. 8, 2012; 4 pages.
"Wowza Pro Media Security"; retrieved on May 9, 2013 from http://downloads.wowza.com/hide457892_WowzaMediaServer-2-0-0-preview1/WowzaProMediaSecurity_UsersGuide.pdf; Copyright 2006-2009 Wowza Media Systems, Inc.; 18 pages.

* cited by examiner

*Primary Examiner* — Venkat Perungavoor
(74) *Attorney, Agent, or Firm* — Toler Law Group, PC

(57) ABSTRACT

Systems and methods of token-based protection for links to media streams are disclosed. For example, a web server may generate a first token based on a private key and an encryption algorithm. The first token may be inserted into a link to a media stream, where the link is included in a web page and the media stream is hosted by a media server. When the link is selected at a client device, a media request including the first token may be sent to the media server. The media server may generate a second token based on the private key and the encryption algorithm. The media server may selectively grant or deny the media request based on whether the first token matches the second token.

20 Claims, 6 Drawing Sheets

US 8,640,229 B1

TOKEN-BASED SECURITY FOR LINKS TO MEDIA STREAMS

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

Internet video publishers often publish webpages that include links (e.g., hyperlinks) to video streams. The publication cost of each video stream may depend on how many viewers access the video stream using the published link. To control publication costs, it may be beneficial to restrict the number of simultaneous and total viewers of a video stream. For example, if a paying subscriber shares a link to a video stream with a non-paying subscriber, it may be beneficial to prevent the non-paying subscriber from using the link to access the video stream, to reduce bandwidth costs.

SUMMARY

Systems and methods of token-based link security are disclosed. In accordance with the described techniques, a webpage hosted by a web server may include a link to a media stream. The link includes an embedded security token that is generated by the web server based on a private key and an encryption algorithm. In one example, the private key and the encryption algorithm are pre-configured by a publisher (e.g., an owner of the web server). The link points to a media server that hosts the media stream, and the private key and the encryption algorithm are pre-configured at the media server. When a client device attempts to resolve the link (e.g., a user at the client device clicks on the link), the security token is automatically provided to the media server. The media server uses the pre-configured private key and the encryption algorithm to generate a second token. If the second token matches the security token embedded in the link, the media server grants the client device access to the media stream. Otherwise, the media server denies access to the media stream.

DETAILED DESCRIPTION

Figure 1:
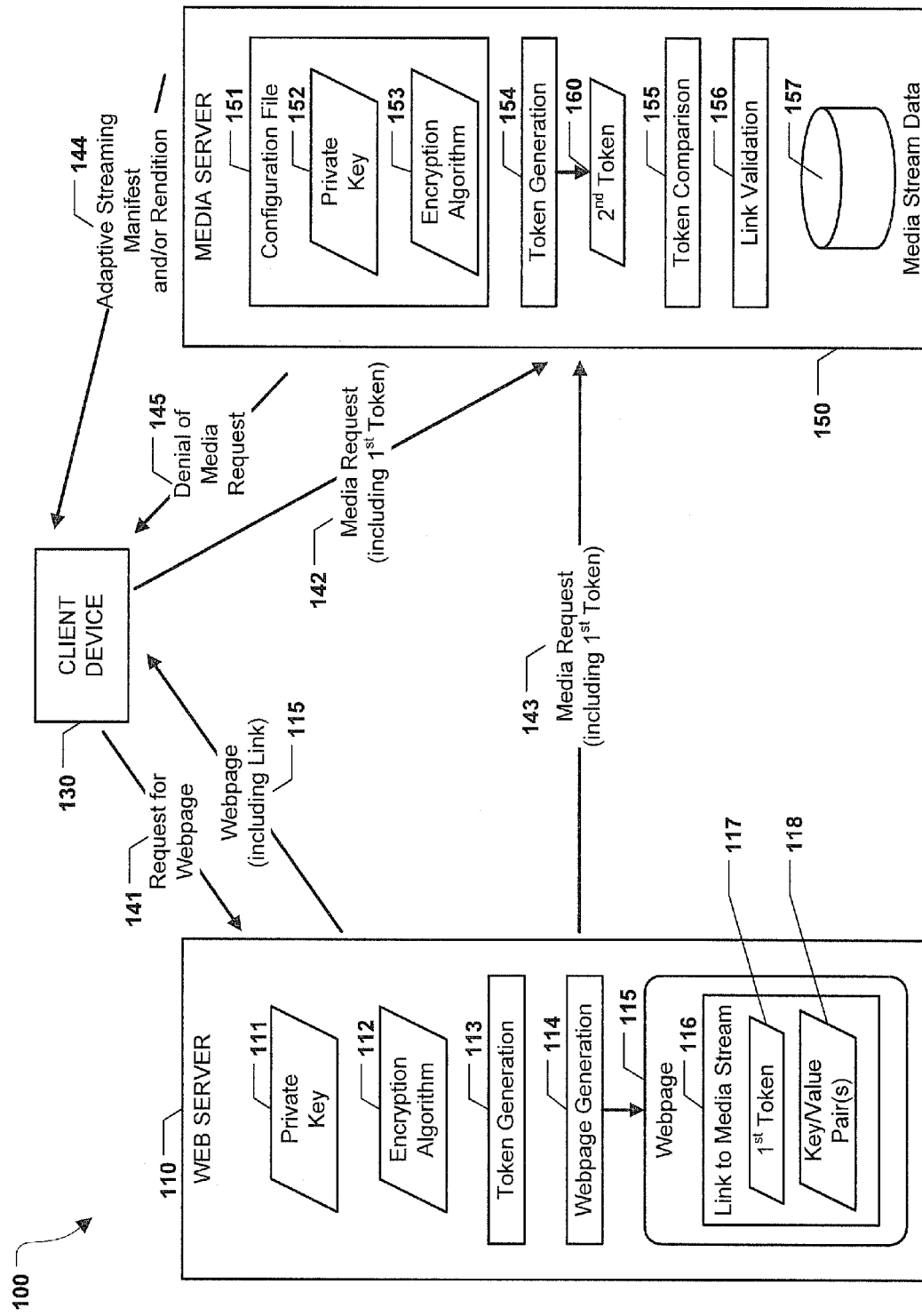
FIG. 1 is a block diagram of a particular embodiment of a system that is operable to implement token-based security for links to media streams.

FIG. 1 is a block diagram of a particular embodiment of a system 100 that is operable to implement token-based security for links to media streams. The system 100 includes a web server 110, a media server 150, and a client device 130, each of which may be communicably coupled to a network (e.g., a local area network (LAN) and/or the Internet).

The web server 110 may store (e.g., in random access memory (RAM) and/or non-volatile memory) a private key 111 and an encryption algorithm 112. In a particular embodiment, the private key 111 and the encryption algorithm 112 are configured by a media publisher (e.g., an owner of the web server 110). For example, the private key 111 may be a shared secret or encryption key that is unique to or associated with the media publisher. The encryption algorithm 112 may be selected by the media publisher from amongst a plurality of encryption algorithms that are supported by the web server 110. In an illustrative example, the encryption algorithm 112 may include hash-based message authentication code (HMAC) secure hash algorithm (SHA) 2 (HMAC-SHA-2), HMAC-SHA-256, HMAC-SHA-3, another hash-based encryption algorithm, a non-hash-based encryption algorithm (e.g., a message authentication code algorithm), or any combination thereof. The ability to select the encryption algorithm 112 may provide the media publisher with increased flexibility for implementing link security. For example, the media publisher may create or purchase third-party-developed encryption algorithms that use various dynamic server-side technologies, including PRP, Perl, Ruby, ASP(.NET), C#.NET, Java®, and JavaScript® (e.g., remote scripting). Java and JavaScript are registered trademarks of Oracle Corp. of Redwood City, Calif.

The web server 110 may also include a token generation module 113 and a webpage generation module 114. In a particular embodiment, the token generation module 113 and the webpage generation module 114 correspond to software executed by the web server 110. For example, the token generation module 113 and the webpage generation module 114 may be represented by instructions that are executable by one or more processors of the web server 110. The token generation module 113 may be configured to generate security tokens based at least in part on the private key 111 and the encryption algorithm 112. In a particular embodiment, security tokens may be generated further based on at least a portion of a media stream uniform resource locator (URL), as further described with reference to FIG. 2. The webpage generation module 114 may be configured to dynamically generate a webpage 115 (or at least a portion thereof) and insert a link 116 to a media stream into the webpage 115. The link 116 includes a security token 117 generated by the token generation module 113. An example of the link 116 including the security token 117 is further described with reference to FIG. 2.

The media server 150 may host the media stream that is accessible via the link 116. The media stream may be a live stream or a video on demand (VOD) stream, as further described with reference to FIG. 6. The media server 150 may also store a private key 152 and an encryption algorithm 153 and may include a token generation module 154. The private key 152 is a copy of the private key 111 at the web server 110 and the encryption algorithm 153 is a copy of the encryption algorithm 112 at the web server 110. Thus, the token generation module 154 can use the private key 152 and the encryption algorithm 153 to generate a security token 160 (second token) that is identical to the security token 117 (first token) generated by the token generation module 113 at the web server 110.

The media server 150 may further include a token comparison module 155 configured to compare the token 160 (second token) generated by the token generation module 154 to token 117 (first token). When the first and second tokens (117 and 160) match, the media server 150 may grant the client device 130 access to media stream data 157 associated with the media stream. For example, the media stream data 157 may include audio data, video data, and/or an adaptive streaming manifest, as further described with reference to FIG. 6. In a particular embodiment, the token generation module 154 and the token comparison module 155 correspond to software executed by the media server 150. For example, the token generation module 154 and the token comparison module 155 may be represented by instructions that are executable by one or more processors of the media server 150.

During operation, the web server 110 and the media server 150 may receive a private key and an identification of an encryption algorithm from a publisher of a media stream. The private key and the identification of the encryption algorithm may be stored in a configuration file (e.g., an illustrative configuration file 151 at the media server 150). For example, the configuration file 151 may be an extensible markup language (XML) configuration file that includes the private key 152 and that identifies the encryption algorithm 153. As another example, private keys (e.g., the private key 111 and/or the private key 152) may be stored in a database, an external data storage device, etc. In some embodiments, the publisher may configure the private key and the encryption algorithm at the web server 110, and the web server 110 may send the private key and the identification of the encryption algorithm to the media server 150.

The client device 130 may transmit a request 141 for the webpage 115 to the web server 110. For example, the request 141 may be generated by a web browser executing on the client device 130. In response to the request 141, the web server 110 may send the webpage 115 to the client device 130. The webpage 115 includes the link 116 to the media stream hosted by the media server 150.

In a particular embodiment, the webpage 115, the link 116, and/or the first token 117 is generated in response to the request 141 based on data included in the request 141. For example, the token generation module 113 may generate the first token 117 by executing the encryption algorithm 112 on a set of inputs, where the set of inputs includes the private key 111 and information included in the request 141 (e.g., data associated with the media stream, data associated with the client device 130, and/or data associated with the user of the client device 130). The webpage generation module 114 may generate the webpage 115 that includes the link 116 and that includes the first token 117. In a particular embodiment, the token generation module 113 may be integrated into an application executing on the web server 110 (e.g., a custom application provided by an owner of the web server 110, an application provided by a vendor of the media server 150, etc.).

After receiving the webpage 115, the client device 130 may transmit a media request 142 that includes the first token 117 to the media server 150. For example, the media request 142 may be sent to the media server 150 (e.g., via the Internet) in response to a user selecting (e.g., clicking on) the link 116. Alternatively, selection of the link 116 may cause the web server 110 to send a media request 143 (including the first token 117) to the media server 150 on behalf of the client device 130. In response to receiving the media request 142 (or the media request 143), the media server 150 generates the second token 160 using the private key 152, the encryption algorithm 153, and information included in the request 142 (e.g., data associated with the media stream, data associated with the client device 130, and/or data associated with the user of the client device 130). For example, the private key 152 and the information included in the request 142 (e.g., a client identifier, a base uniform resource locator (URL), etc.) may be provided as inputs to the encryption algorithm 153, which generates the second token 160 as an output.

When the first token 117 matches the second token 160, the media server 150 may grant the media request 142, as shown at 144. For example, the media server 150 may generate and send an adaptive streaming manifest to the client device 130. As another example, the media server 150 may send an adaptive streaming rendition of the media stream to the client device 130. When the first token 117 does not match the second token 160, the media server 150 may send a denial 145 to the client device 130. In a particular embodiment, the denial 145 includes an error code. Alternately, or in addition, the denial 145 may include a message indicating why the media request 142 was denied. Further, in some embodiments, the media server 150 may redirect the client device 130 (e.g., to the web server 110 or another web server, to another media server, etc.) when the media request 142 is denied.

In a particular embodiment, the link 116 to the media stream includes one or more key/value pairs 118, and the media server 150 further includes a link validation module 156 configured to process the key/value pair(s) 118. The key/value pair(s) 118 may correspond to media streaming parameters associated with the media stream, such as a validity start date, a validity start time, a validity end date, a validity end time, a validity duration, or any combination thereof. In a particular embodiment, the key/value pair(s) 118 may include "reserved" pairs and/or custom (e.g., publisher-defined) pairs. Reserved key/value pair(s) may be used to embed into the link 116 a start date/time "sts" UNIX timestamp (e.g., "sts= . . . "), an end date/time "ets" UNIX timestamp (e.g., "ets= . . . "), a duration in seconds (e.g., "dur= . . . "), and the token 117 itself (e.g., "token= . . . "). The publisher may configure custom names for reserved key/value pairs (e.g., "etimetamp" instead of "ets"). It should be noted that the description of UNIX timestamps is for example only. In alternate embodiments, other timestamps, datestamps, timecodes, datecodes, etc. may be used. In a particular embodiment, one or more key/value pairs may be used during generation of a security token, as further described with reference to FIG. 2.

When a user clicks on the link 116, the key/value pair(s) 118 may be provided to the media server 150 as part of the media request 142. The link validation module 156 may interpret the key/value pair(s) 118 to determine if the link 116 is valid. When the link 116 is invalid (e.g., a validity time period defined by the key/value pair(s) 118 has elapsed), the media server 150 may deny the media request 142, regardless of whether the first token 117 matches the second token 160. When the validity time period for the link 116 is defined as a duration, the media server 150 may maintain a timer to determine whether the duration has elapsed.

The system 100 of FIG. 1 may thus enable token-based protection for links to media streams. For example, performing token generation and matching prior to granting client access to a media stream may enable control over how many client devices can access the media stream using a particular link. Further, key/value pair(s) embedded in the link may be used to limit how long the link remains valid. The system 100 of FIG. 1 may thus assist a media publisher in controlling publication costs and preventing unauthorized access to a media stream.

Further, the token-based link protection mechanism may be independent of a protocol of the media stream (e.g., the link protection is protocol agnostic). Thus, the described techniques may be used for various media streaming protocols, including, but not limited to, real time messaging protocol (RTMP) (and variants thereof), real-time streaming protocol (RTSP), hypertext transfer protocol (HTTP), HTTP live streaming (HLS), HTTP dynamic streaming (HDS), smooth streaming, and motion picture experts group (MPEG) dynamic adaptive streaming over HTTP (MPEG-DASH). In a particular embodiment, the media server 150 performs token comparison and link validation each time a device attempts to access the media stream or a portion thereof. Thus, the media server 150 may perfoi in token comparison and link validation at both connect-level and play-level (in the case of RTMP), and before granting access to either parent or child adaptive streaming manifests (in the case of HLS). The token-based link protection mechanism may also be independent of the media player application used to play the media stream at the client device 130. Thus, the system 100 of FIG. 1 may enable link protection regardless of whether the media player application is a native application or a custom third-party application.

Figure 2:
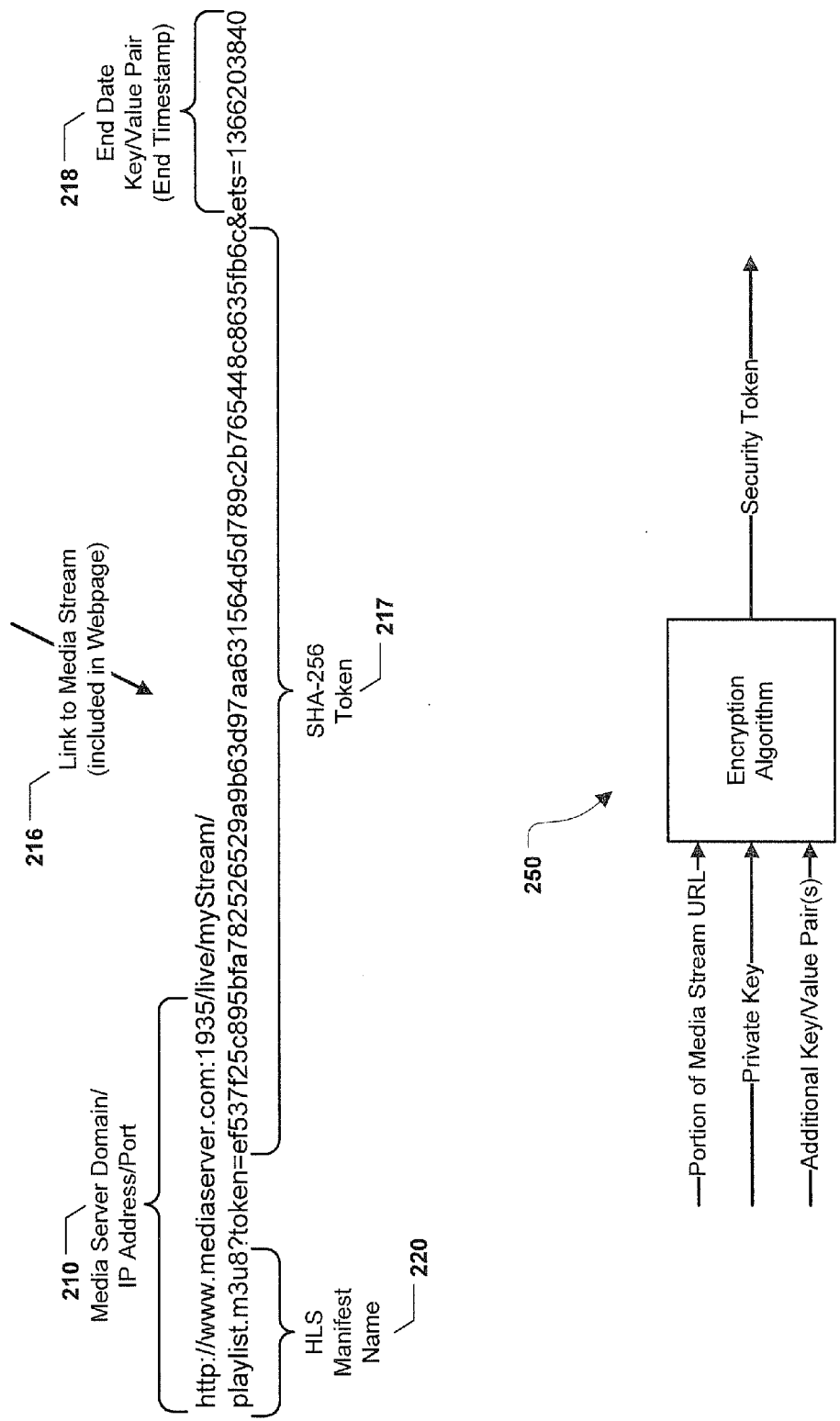
FIG. 2 is a diagram to illustrate a particular embodiment of a link to a media stream, where the link includes an embedded security token.

FIG. 2 is a diagram to illustrate a particular example of a link 216 to a media stream (e.g., the link 116 of FIG. 1). In FIG. 2, the link 216 is a link to an HLS manifest, contains an SHA-256 token, and contains an associated end date parameter.

The link 216 may include identification data 210 for the media server that hosts the media stream. To illustrate, the identification data 210 may identify the media server 150 of FIG. 1 by domain, internet protocol (IP) address, and/or port. In the example of FIG. 2, the link 216 specifies the domain "www.mediaserver.com" and port number 1935. The link 216 may also include a name 220 of the HLS manifest (e.g., "playlist.m3u8"). The link 216 may further include an encrypted SHA-256 token 217 (e.g., the first token 117 of FIG. 1) and an end date key/value pair 218 (e.g., one of the key/value pair(s) 118 of FIG. 1). Thus, when the media server 150 is accessed via the link 216, the media server 150 grants access to the media stream when the second token 160 matches the SHA-256 token 217 and the current date/time is earlier than the date/time identified by the end date key/value pair 218.

As illustrated at 250, an encryption algorithm may generate a security token based on at least a portion of a media stream URL (e.g., "/live/myStream/playlist.m3u8", a private key, and/or one or more additional key/value pairs (e.g., "ets=1366203840"). In a particular embodiment, the private key is a required input to the encryption algorithm, whereas the portion of the media stream URL and the key/value pair(s) are optional inputs.

Figure 3:
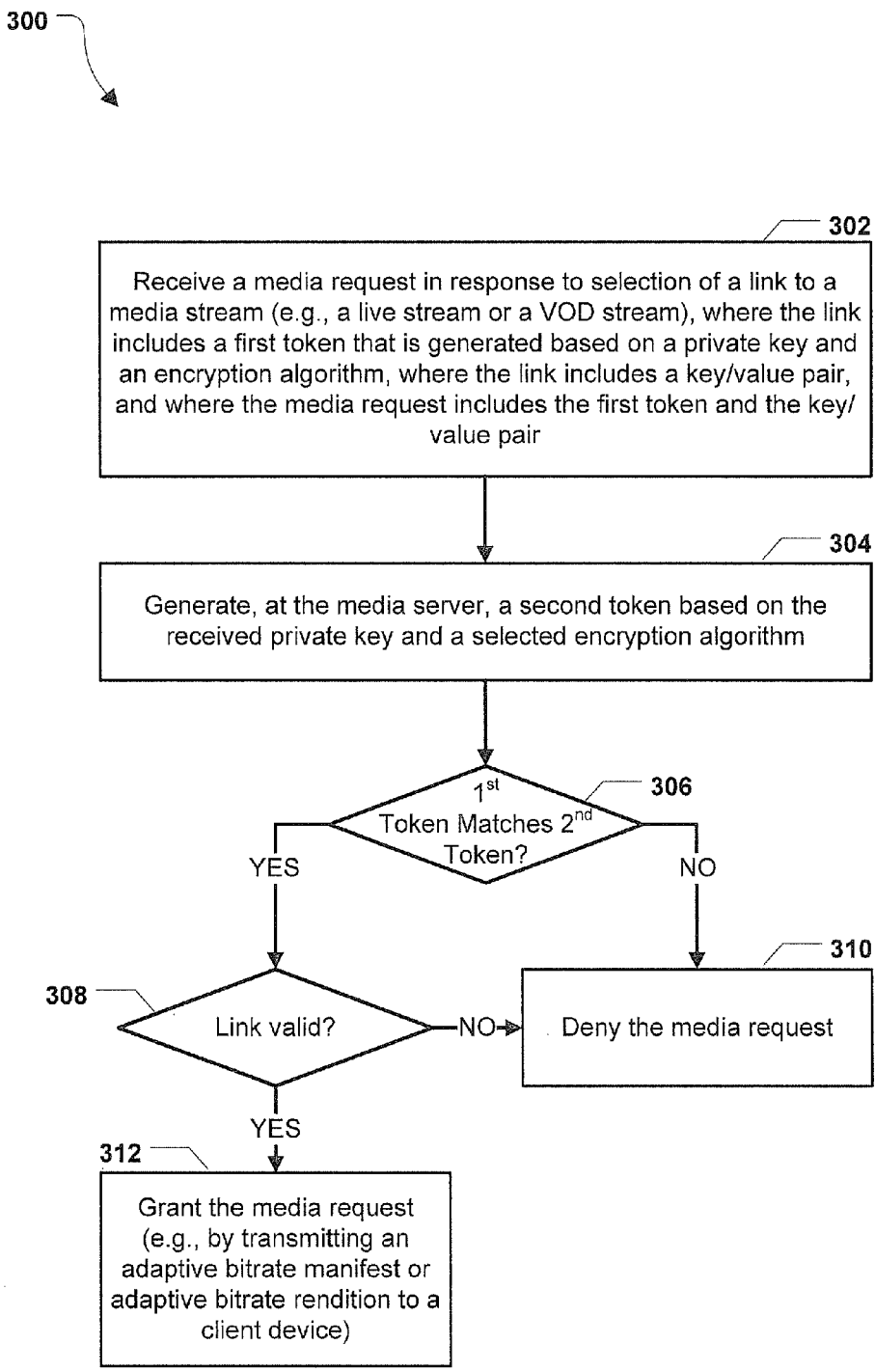
FIG. 3 is a flowchart to illustrate a particular embodiment of a method of operation at a media server of the system of FIG. 1.

FIG. 3 is a flowchart to illustrate a particular embodiment of a method 300 of operation at the media server 150 of FIG. 1. The method 300 may include receiving a media request in response to selection of a link to a media stream, at 302. For example, the media request may be received at the media server in response to selection of the link on a webpage. The media stream may be a live stream or a VOD stream. The link includes a first token that is generated based on a private key and an encryption algorithm. The link may also include a key/value pair. The media request may include the first token and the key/value pair. For example, referring to FIG. 1, the media server 150 may receive the media request 142, where the media request 142 includes the first token 117 and the key/value pair(s) 118.

The method 300 may also include generating, at the media server, a second token based on a received private key and a selected encryption algorithm, at 304. For example, in FIG. 1, the media server 150 may generate the second token 160 based on the private key 152 and the encryption algorithm 153. In a particular embodiment, the private key 152 and additional client data (e.g., data included in the media request 142) are provided as input to the encryption algorithm 153, which generates the second token 160 as an output.

The method 300 may further include determining whether the first token matches the second token, at 306. When the first token does not match the second token, the method 300 includes denying the media request, at 310. When the first token matches the second token, the method 300 may include determining if the link to the media stream is valid, at 308. When the link to the media stream is determined to be invalid (e.g., a validity time period has elapsed), the method 300 includes denying the media request, at 310. For example, in FIG. 1, the media server 150 may transmit the denial 145 to the client device 130. When the link is determined to be valid, the method 300 includes granting the media request, at 312. For example, the media server 150 may send an adaptive streaming manifest or an adaptive streaming rendition of the media stream to the client device 130, as shown at 144.

Figure 4:
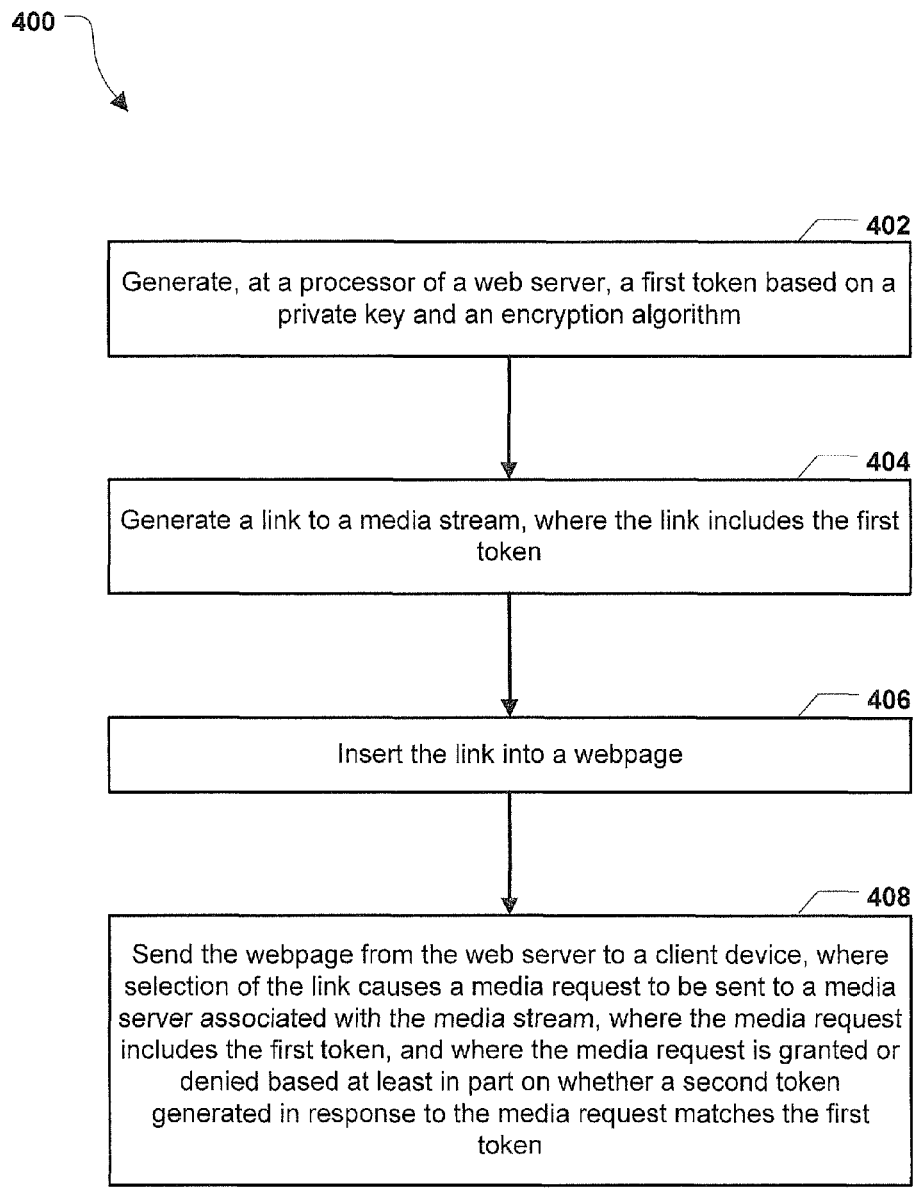
FIG. 4 is a flowchart to illustrate a particular embodiment of a method of operation at a web server of the system of FIG. 1.

FIG. 4 is a flowchart to illustrate a particular embodiment of a method 400 of operation at the web server 110 of FIG. 1. The method 400 may include generating, at a processor of a web server, a first token based on a private key and an encryption algorithm, at 402. For example, in FIG. 1, the web server 110 may generate the first token 117 based on the private key 111 and the encryption algorithm 112.

The method 400 also includes generating a link to a media stream, at 404, and inserting the link into the webpage, at 406. The link includes the first token. For example, in FIG. 1, the web server 110 may generate and insert the link 116 into the webpage 115, where the link 116 includes the first token 117.

The method 400 further includes sending the webpage from the web server to a client device, at 408. For example, in FIG. 1, the web server 110 may send the webpage 115 to the client device 130. Selection of the link 116 may cause the media request 142 to be sent to the media server 150 associated with the media stream, where the media request 142 includes the first token 117. The media request 142 may be granted or denied based at least in part on whether the second token 160 generated in response to the media request 142 matches the first token 117.

The method 400 of FIG. 4 may thus enable a media publisher to implement token-based link security in scenarios where servers that generate links to media streams (e.g., web servers) are distinct from servers that host the media streams (e.g., media servers). It should be noted that although embodiments herein are described with reference to a single client device accessing a single media stream, this is for illustration only. The described token-based link protection techniques may be used by web server(s) to generate multiple links to multiple media streams for multiple client devices in parallel and may be used by media server(s) to perform multiple token comparisons and link validity checks in parallel.

Figure 5:
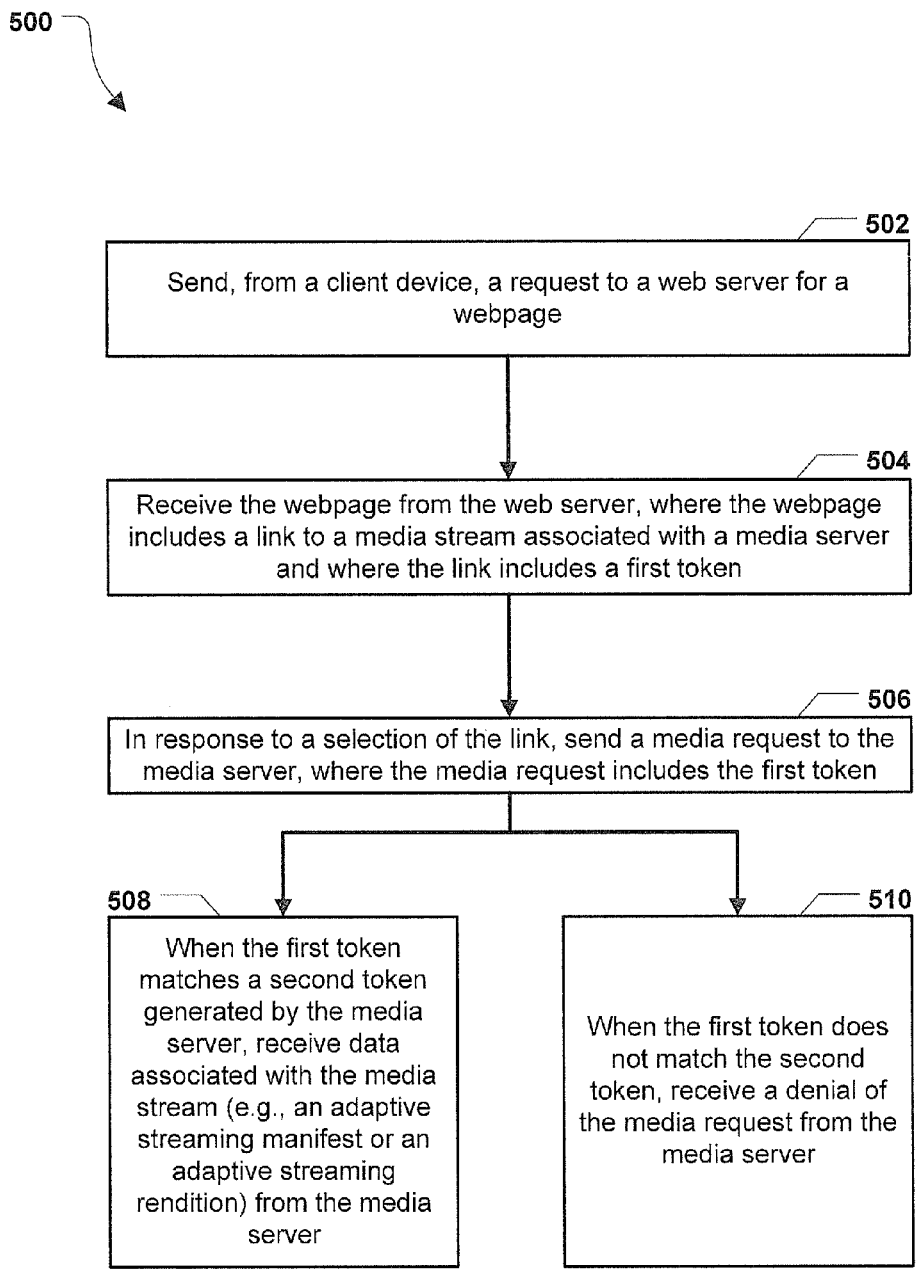
FIG. 5 is a flowchart to illustrate a particular embodiment of a method of operation at a client device of the system of FIG. 1.

FIG. 5 is a flowchart to illustrate a particular embodiment of a method 500 of operation at the client device 130 of FIG. 1. The method 500 may include sending, from a client device, a request to a web server for a webpage, at 502. For example, in FIG. 1, the client device 130 may send the request 141 for the webpage 115 to the web server 110.

The method 500 may also include receiving the webpage from the web server, at 504. The webpage may include a link to a media stream associated with a media server, and the link may include a first token. For example, in FIG. 1, the client device 130 may receive the webpage 115, where the webpage includes the link 116 that includes the first token 117.

The method 500 may further include sending a media request to the media server in response to a selection of the link, at 506. The media request may include the first token. For example, in FIG. 1, the client device 130 may send the media request 142 to the media server 150, where the media request 142 includes the first token 117.

When the first token matches a second token generated by the media server, the method 500 may include receiving data associated with the media stream, at 508. For example, in FIG. 1, when the second token 160 matches the first token 117, the client device 130 may receive at least a portion of the media stream data 157.

Alternatively, when the first token does not match the second token, the method 500 may include receiving a denial of the media request from the media server, at 510. For example, in FIG. 1, the client device 130 may receive the denial 145 (e.g., an error code or an error message).

The method 500 of FIG. 5 may thus support token-based link protection at a client device. Further, because the tokens are generated by a web server and a media server, such token-based link protection may be supported by the client device without installation of additional software at the client device.

Figure 6:
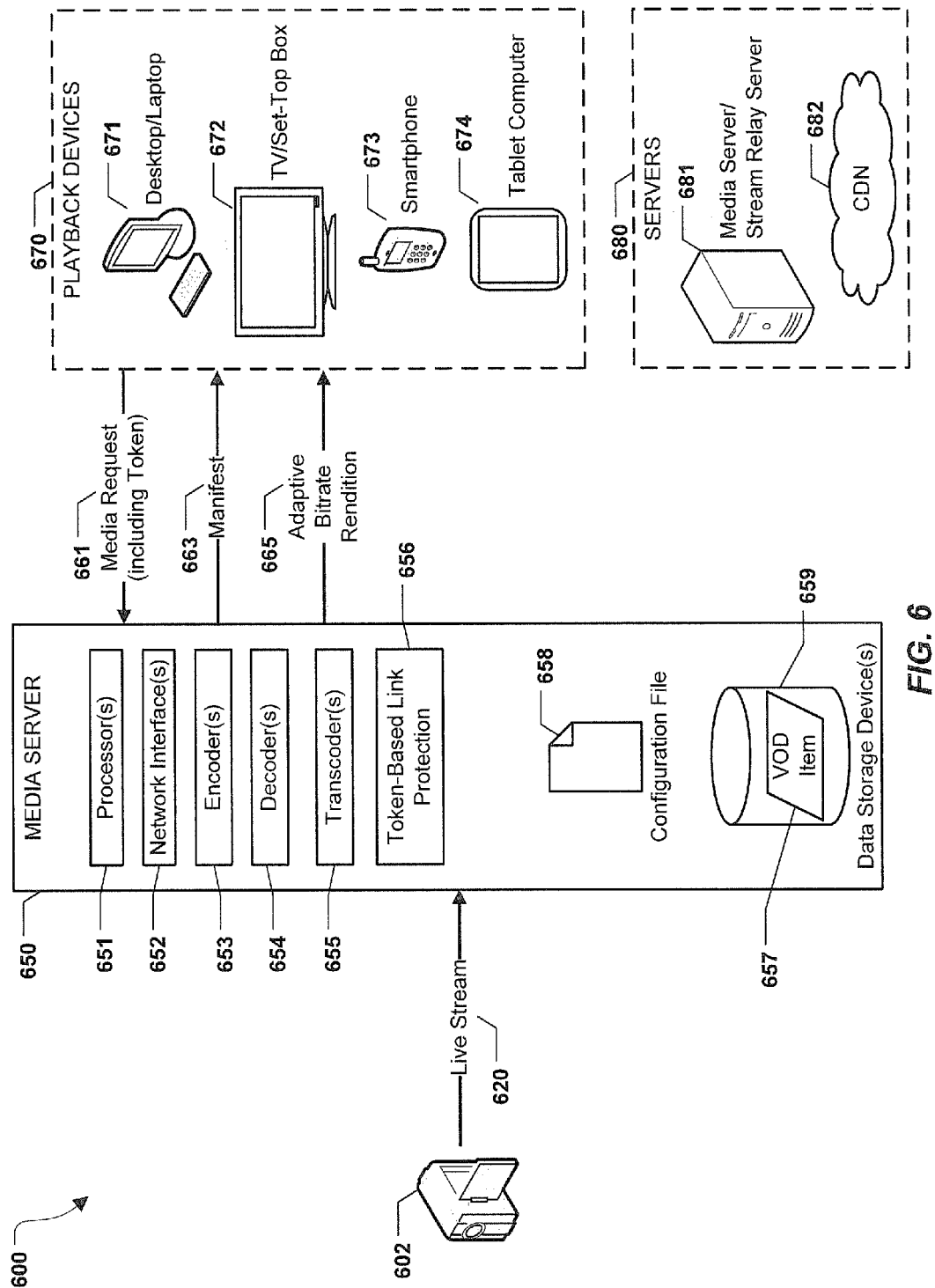
FIG. 6 is a block diagram of another particular embodiment of a system that is operable to implement token-based security for links to media streams.

FIG. 6 is a diagram to illustrate another particular embodiment of a system 600 that is operable to support token-based protection for links to media streams. The system 600 includes a media server 650 that is configured to send data to and receive data from various other devices (e.g., via a network, such as a local area network (LAN) or the Internet). For example, the media server 650 may communicate with one or more playback devices 670 (e.g., devices that are configured to stream video content) and one or more other servers 680. In an illustrative embodiment, the media server 650 includes the media server 150 of FIG. 1, and the playback devices 670 include the client device 130 of FIG. 1. It should be noted that the illustrated playback devices 670 are examples. The playback devices 670 may include additional client devices and/or other types of devices capable of accessing webpages and/or playing media streams.

The media server 650 may include one or more processors 651 and various components that are executable by the processor(s) 651. The media server 650 may correspond to or include software application(s) that perform media serving or processing, hardware systems (e.g., servers) that support or perform media serving and processing, or any combination thereof. Thus, various operations described with reference to the media server 650, or components thereof, may be implemented using hardware, software (e.g., instructions executable by the processor(s) 651), or any combination thereof.

The media server 650 may include one or more network interfaces 652. For example, the network interface(s) 652 may include input interface(s) and output interface(s) that are configured to receive data and to send data, respectively. In a particular embodiment, the network interface(s) 652 may be wired and/or wireless interfaces that enable the media server 650 to communicate data via a network, such as the Internet. For example, the network interface(s) 652 may include an Ethernet interface, a wireless interface compatible with an Institute of Electrical and Electronics Engineers (IEEE) 802.11 (e.g., Wi-Fi) protocol, or other wired or wireless interfaces.

The network interface(s) 652 may be configured to receive one or more media streams, such as an illustrative live media stream 620 from a capture source 602 (e.g., a camera). The live media stream 620 may include audio data, video data, text data, closed captioning (CC) data, and/or subtitle data. The network interface(s) 652 may also be configured to transmit data to the one or more playback devices 670 (e.g., a smartphone, a tablet computer, a laptop computer, a desktop computer, a set-top box, a television, a portable media player, a game console, etc.). In the embodiment of FIG. 6, the playback devices 670 include a desktop/laptop computing device 671, a television (TV)/set-top box 672, a smartphone 673, and a tablet computer 674. The network interface(s) 652 may further be configured to transmit data to the one or more other servers 680 (e.g., a media server, a stream relay server, a server of a content distribution network (e.g., an edge server), etc.). In the embodiment of FIG. 6, the other servers 680 include a media server/stream relay server 681 and a server of a content distribution network (CDN) 682. In a particular embodiment, data transmitted to the playback devices 670 and to the servers 680 includes video streams. The video streams may be associated with the same encoding format and transmission protocol or may be associated with different encoding formats and transmission protocols. In a particular embodiment, generating the video streams includes performing video decoding, encoding, transcoding, and/or transmuxing operations at the media server 650 (e.g., to modify a video encoding format, an audio encoding format, a bitrate, an aspect ratio, packaging, etc. relative to the incoming video stream 620). In a transmuxing operation, encoded audio and video may be repackaged without modifying the encoded audio and video.

The media server 650 may include various components configured to perform stream processing functions. For example, the media server 650 may include one or more video processing components, such as encoder(s) 653, decoder(s) 654, and transcoder(s) 655, each of which may be implemented using hardware, software, or both. The decoder(s) 654 may decode data received by the media server 650. For example, the decoder(s) 654 may decode received streams (e.g., live audio-only, video-only, or audio-video streams). The encoder(s) 653 may encode data that is to be transmitted by the media server 650. The transcoder(s) 655 may be configured to perform bitrate conversion, CODEC conversion, frame size conversion, etc. Depending on a format of a received stream, a playback format supported by a requesting device, and/or transcoding parameters in use, a transcoding operation performed by the transcoder(s) 655 may trigger a decoding operation by the decoder(s) 654 and/or a re-encoding operation by the encoder(s) 653. In a particular embodiment, parameters used by the transcoder(s) 655 are stored in one or more transcoding templates at the media server 650. The encoder(s) 653, decoder(s) 654, and transcoder(s) 655 may thus enable the media server 650 to process data in accordance with multiple coding technologies and protocols.

For example, the media server 650 may support video encoding types including, but not limited to, H.264, On2® VP-based encoding (On2 is a registered trademark of Google Inc. of Mountain View, Calif.), Sorenson Spark® (Sorenson Spark is a registered trademark of Sorenson Media, Inc. of Salt Lake City, Utah), Screen video, Screen video 2, motion picture experts group (MPEG) 2 (MPEG-2), and MPEG-4 Part 2. The media server 650 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 650 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 650 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The media server 650 may include one or more data storage devices 659 (e.g., random access memory (RAM), disk-based storage, etc.). The data storage device(s) 659 may store stream data (e.g., frames of a live video stream), files, closed caption data, images (e.g., to be overlaid on top of a video stream), and other data. In a particular embodiment, the data storage device(s) 659 store a video on demand (VOD) item 657. The VOD item 657 may include audio data, video data, text data, closed captioning (CC) data, and/or subtitle data. For example, the VOD item 657 may be a movie or a television show. Alternately, the VOD item 657 may be stored remote from the media server 650 and may be accessible by the media server 650 via a network (e.g., the Internet).

The media server 650 may also include a token-based link protection module 656. In an illustrative embodiment, the token-based link protection module 656 includes functions as described with reference to the token generation module 154, the token comparison module 155, and the link validation module 156 of FIG. 1.

In a particular embodiment, the media server 650 may support adaptive streaming. For example, the media server 650 may be configured to generate an adaptive streaming manifest 663. The manifest 663 may include information describing adaptive bitrate renditions that are available for adaptive streaming. To initiate an adaptive streaming session, a destination device (e.g., one of the playback devices 670) may request the manifest 663. Upon receiving the manifest 663, the destination device may determine which of the available renditions should be requested from the media server 650. For example, the destination device may make such a determination based on buffering/processing capability at the destination device and/or network conditions (e.g., bandwidth) being experienced by the destination device.

Upon determining which rendition should be requested, the destination device may transmit a request to the media server 650. The request may specify a particular portion (e.g., portion "X") of the requested rendition. The particular portion may be specified using start/end frame numbers, start/end times, a portion number/identifier, etc. Depending on the adaptive streaming protocol in use, the requested portion may correspond to a "chunk" of a rendition and/or a group of pictures (GOP). A "chunk" may refer to a fixed (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the destination device may request a subsequent portion (e.g., portion "X+1") of the same rendition. However, if playback and/or network conditions become worse, the destination device may switch to a lower bitrate rendition by requesting subsequent portions of the lower bitrate rendition. Conversely, if playback and/or network conditions improve, the destination device may switch to a higher bitrate rendition. The media server 650 may generate key frame aligned portions for the adaptive streaming renditions, so that switching to a lower bitrate or higher bitrate rendition appears "seamless" (e.g., does not result in noticeable visual glitches or dropped frames).

During operation, the media server 650 may receive a media request 661 from a playback device, such as the tablet computer 674. In an illustrative embodiment, the media request 661 is the media request 142 of FIG. 1 and includes the first token 117 of FIG. 1. The token-based link protection module 656 may generate a second token based on a private key and an encryption algorithm. For example, the private key and the encryption algorithm may be identified by a configuration file 658 at the media server 650. When the second token matches the first token, the media server 650 may grant the media request 661. For example, the media server 650 may transmit an adaptive streaming manifest 663 associated with the live stream 620 or the VOD item 657 to the tablet computer 674. The tablet computer 674 may select a particular rendition 665 of the live video stream 620 from the manifest 663 and send the media server 650 a request for the selected rendition 665. The media server 650 may provide the requested rendition 665 to the tablet computer 674, as shown. Token-based link protection may be applied for an initial request to initiate an adaptive streaming session, for each chunk/portion of an adaptive stream, for selected chunks/portion of an adaptive stream (e.g., periodically), or any combination thereof. In a particular embodiment, the token-based link protection includes information associated with the tablet computer 674 to generate the token. Thus, use of the link by devices other than the tablet computer 674 results in a token mismatch, enabling the media server 650 to enforce a one-device-per-link restriction. Alternately, or in addition, the token includes key/value pair(s) that define a validity time period for the link, enabling the media server 650 to restrict unauthorized client devices from using "stale" (e.g., invalid) links to view media streams.

It should be noted that the orders of steps described with reference to FIGS. 1 and 6 and illustrated in the flowcharts of FIGS. 3-5 are to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the web server 110 of FIG. 1, the client device 130 of FIG. 1, the media server 150 of FIG. 1, the media server 650 of FIG. 6, the desktop/laptop computing device 671 of FIG. 6, the TV/set-top box 672 of FIG. 6, the smartphone 673 of FIG. 6, the tablet computer 674 of FIG. 6, the media server/stream relay server 681 of FIG. 6, a server (e.g., edge server) of the CDN 682 of FIG. 6, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a non-transitory computer-readable or a processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. For example, a computer-readable or processor-readable medium or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage medium or device.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)).

In a particular embodiment, an apparatus includes a processor and memory storing instructions executable by the processor to perform operations including receiving, at a media server, a media request in response to selection of a link to a media stream. The link includes a first token that is generated based on a private key and an encryption algorithm, and the media request includes the first token. The operations also include generating, at the media server, a second token based on the received private key and the encryption algorithm. When the first token matches the second token, the operations include granting the media request. When the first token does not match the second token, the operations include denying the request.

In another particular embodiment, a method includes generating, at a processor of a web server, a first token based on a private key and an encryption algorithm. The method also includes generating a link to a media stream, where the link includes the first token. The method further includes inserting the link into a webpage and sending the webpage from the web server to a client device. Selection of the link causes a media request to be sent to a media server associated with the media stream, where the media request includes the first token. The media request is granted or denied based on whether a second token generated in response to the media request matches the first token.

In another particular embodiment, a computer-readable storage device stores instructions that, when executed by a computer, cause the computer to perform operations including sending, from a client device, a request to a web server for a webpage. The operations also include receiving the webpage from the web server, where the webpage includes a link to a media stream associated with a media server and where the link includes a first token. The operations further include, in response to a selection of the link, sending a media request to the media server, where the media request includes the first token. When the first token matches a second token generated by the media server, the operations include receiving data associated with the media stream from the media server. When the first token does not match the second token, the operations include receiving a denial of the media request from the media server.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
a processor; and
a memory storing instructions executable by the processor to perform operations comprising:
receiving, at a media server, a media request in response to selection of a link to a media stream, wherein the link includes a first token that is generated based on a private key and an encryption algorithm, and wherein the media request includes the first token;

generating, at the media server, a second token based on the private key and the encryption algorithm;

when the first token matches the second token, granting the media request; and when the first token does not match the second token, denying the request.

2. The apparatus of claim 1, further comprising receiving, at the media server, the private key from a publisher of the media stream.

3. The apparatus of claim 1, wherein the private key and the encryption algorithm are identified in a configuration file of the media server.

4. The apparatus of claim 1, further comprising receiving, at the media server, the private key and a selection of the encryption algorithm from a web server that hosts a webpage including the link to the media stream.

5. The apparatus of claim 1, wherein the link further includes a key/value pair corresponding to a media streaming parameter, wherein the media streaming parameter includes a validity start date, a validity start time, a validity end date, a validity end time, a validity duration, or any combination thereof.

6. The apparatus of claim 5, wherein the media request includes the key/value pair.

7. The apparatus of claim 5, wherein the operations further comprise:

determining, at the media server, whether the link to the media stream is valid based on the key/value pair; and denying the request when the link to the media stream is invalid.

8. The apparatus of claim 1, wherein granting the media request comprises transmitting an adaptive streaming manifest associated with the media stream from the media server to a client device.

9. The apparatus of claim 1, wherein granting the media request comprises transmitting an adaptive bitrate rendition of the media stream from the media server to a client device.

10. The apparatus of claim 9, wherein the adaptive bitrate rendition is transmitted using an adaptive streaming protocol, wherein the adaptive streaming protocol comprises:

hypertext transfer protocol (HTTP) live streaming (HLS), HTTP dynamic streaming (HDS), smooth streaming, or motion picture experts group (MPEG) dynamic adaptive streaming over HTTP (MPEG-DASH).

11. The apparatus of claim 1, wherein the media stream comprises a live stream.

12. The apparatus of claim 1, wherein the media stream comprises a video on demand (VOD) item.

13. The apparatus of claim 1, wherein the encryption algorithm comprises hash-based message authentication code (HMAC) secure hash algorithm (SHA) 2 (HMAC-SHA-2), HMAC-SHA-256, HMAC-SHA-3, or any combination thereof.

14. The apparatus of claim 1, wherein the media request is received from a web server.

15. The apparatus of claim 1, wherein the media request is received from a client device.

16. A method comprising:

generating, at a processor of a web server, a first token based on a private key and an encryption algorithm;

generating a link to a media stream, wherein the link includes the first token;

inserting the link into a webpage;

and sending the webpage from the web server to a client device, wherein selection of the link causes a media request to be sent to a media server associated with the media stream, wherein the media request includes the first token, and wherein the media request is granted or denied based on whether a second token generated by the media server in response to the media request matches the first token.

17. The method of claim 16, further comprising generating the first token in response to receiving the request for the webpage from the client device.

18. The method of claim 16, further comprising sending the media request from the web server to the media server.

19. A computer-readable storage device storing instructions that, when executed by a computer, cause the computer to perform operations comprising:

sending, from a client device, a request to a web server for a webpage;

receiving the webpage from the web server, wherein the webpage includes a link to a media stream associated with a media server, and wherein the link includes a first token;

in response to a selection of the link, sending a media request to the media server, wherein the media request includes the first token;

when the first token matches a second token generated by the media server, receiving data associated with the media stream from the media server; and when the first token does not match the second token, receiving a denial of the media request from the media server.

20. The computer-readable storage device of claim 19, wherein the data associated with the media stream includes an adaptive bitrate rendition of the media stream, an adaptive streaming manifest associated with the media stream, or any combination thereof.

* * * * *